United States Patent
Khoury et al.

[11] Patent Number: 5,859,713
[45] Date of Patent: Jan. 12, 1999

[54] IMAGING IN A SCATTERING MEDIUM USING PHOTON DENSITY WAVES

[75] Inventors: Jehad Khoury, Concord, N.H.; Philip Hemmer, Fitchburg, Mass.; Charles L. Woods, Stow; Jonathan Kane, Somerville, both of Mass.

[73] Assignee: The United States of America as represented by the Secretary of the Air Force, Washington, D.C.

[21] Appl. No.: 726,503

[22] Filed: Oct. 7, 1996

[51] Int. Cl.$^6$ .............................. G03H 1/10; G03H 1/12; G03H 1/02

[52] U.S. Cl. .................................. 359/10; 359/11; 359/4; 359/7

[58] Field of Search .................................. 359/10, 11, 31, 359/4

[56] References Cited

U.S. PATENT DOCUMENTS

| | | | |
|---|---|---|---|
| 5,270,853 | 12/1993 | Bashkansky et al. | 359/10 |
| 5,303,031 | 4/1994 | Khoury et al. | 356/345 |
| 5,535,024 | 7/1996 | Khoury et al. | 359/10 |
| 5,555,128 | 9/1996 | Khoury et al. | 359/10 |
| 5,557,431 | 9/1996 | Pepper | 359/10 |

FOREIGN PATENT DOCUMENTS

| 2316055 | 10/1974 | Germany | 359/10 |
|---|---|---|---|

OTHER PUBLICATIONS

A. J. Decker et al, "Electronic heterodyne recording and processing of optical holograms using phase modulatred referenc waves", Applied Optics, vol. 17, No. 6, Mar. 15, 1978, vol. 17, No. 6, pp. 917–921 (359/11).

G. Papi et al., "Imaging through aberrating media by means of phase–modulated reference beam", Conference: Applications of Holography and Optical Data Processing, Jerusalen, Isreal, Aug. 23–26, 1976, pp. 685–695 (359/11).

Leary, M.A.; et al., "Refraction of Diffuse Photon Density Waves," Physical Review Letter, vol. 69, No. 18, 2 Nov. 92, 2658–2661.

*Primary Examiner*—Cassandra C. Spyrou
*Assistant Examiner*—Audrey Chang
*Attorney, Agent, or Firm*—Robert L. Nathans

[57] ABSTRACT

Image derogating optical noise due to light scattering of an object under examination, embedded in a light scattering medium, is substantially reduced by passing a modulated signal laser beam through the scattering medium, and interfering the emerging signal with a coherent modulated reference beam to produce a hologram in a photorefractive member of the object, which in turn is read out of the crystal by a third unmodulated coherent beam to retrieve a clear image of the object. A smart pixel image convertor light valve may be substituted for the photorefractive member.

9 Claims, 1 Drawing Sheet

IMAGING IN A SCATTERING MEDIUM USING PHOTON DENSITY WAVES

STATEMENT OF GOVERNMENT INTEREST

The invention described herein may be manufactured and used by or for the Government for governmental purposes without the payment of any royalty thereon.

BACKGROUND OF THE INVENTION

Imaging through a light scattering medium or imaging an object within a scattering medium is one of the most challenging problems in optical signal processing, and has significant importance in tomography and image processing, and has significant importance in tomography and image formation in biological tissues. One popular "first light" approach to solving this problem is based on the principle of the first arriving light, wherein a time gate is used to separate the information carrying light, or the first light, from the noisy light, namely the subsequent scattered light. In a specific implementation by Mantic and Duguay, a hologram was used as a time gating processor. See "Ultrahigh-speed photography of picosecond light pulses and echoes", Applied Optics, 10, pp. 2162–2170, (1971). Since then, different time gating techniques have been used for performing the time gating, involving electronic and real time holograms, Kerr and Raman cells, and spatial filtering techniques yielding improved signal-to-noise ratios. Unfortunately, these first light techniques require ultrafast pulses and sophisticated instrumentation for ultrafast imaging, thus making them expensive to implement.

An alternative to the first light approach is to use the photon density approach. In this case, the pulsed light is replaced by ultrafast modulated light. When such light propagates within a scattering medium, the intensity of the light, as well as its phase, is determined by the properties of the media. The photon density waves in different scattering media have an analogy to light propagation in materials with different indices of refraction. It has been proven that the photon density waves obey Snell's law of refraction. See M. A. O'Leary et al., "Refraction of Diffuse Density Waves", Physical Review Letters, Vol. 69, No. 18. Therefore, when the photon density waves pass through two different scattering media, one embedded inside the other, the waves refract as if they were passing through materials with different indices of refraction. The result is that by monitoring the output wave, in terms of amplitude and phase, much can be determined about the nature of the object inside the scattering media. In essence, the method of detecting variations in the phases due to different indices of refraction using interferometric techniques, can also be applied to photon density waves passing through scattering media. The difference is that in the interferometric approach, the variation is between the phase of the reference and the signal beams, while in the photon density approach, the variation is between the phase of the modulation of the reference and signal beams.

BRIEF SUMMARY OF AN EMBODIMENT OF THE INVENTION

In accordance with a presently preferred embodiment of the invention, a modulated coherent reference light beam is passed through an object under examination, embedded within a light scattering medium which produces a noisy signal beam due to scattering of the light from the object, which is in turn directed at a holographic storage medium. Such a storage medium can be a photorefractive crystal of barium titanate. At the same time the same modulated coherent reference light beam is directed at the photorefractive crystal to form a two-dimensional hologram containing information about the object image which is optically read out of the crystal in parallel to retrieve an image of the object substantially free of the optical noise due to scatter within the scattering medium. Thus, the invention features processing demodulated light, which carries the phase information of the photon density wave, after it has diffracted off of the object and propogated through the scattering medium, by employing two dimensional parallel optical demodulation of the scattered light.

BRIEF DESCRIPTION OF THE DRAWINGS

Other features and advantages of the present invention will become apparent upon study of the following description, taken in conjunction with the following detailed description of the preferred embodiments of the present invention.

DETAILED DESCRIPTION OF A PREFERRED EMBODIMENT OF THE INVENTION

Figure 1:
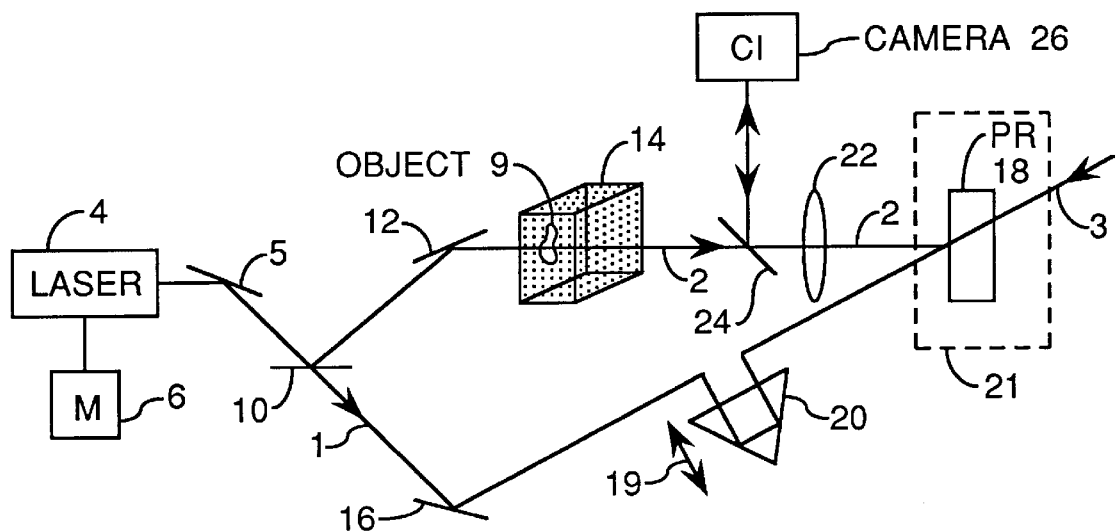
FIG. 1, showing a presently preferred embodiment of the invention employing a holographic real time storage medium comprising a photorefractive crystal.

In FIG. 1, a laser diode 4 is amplitude modulated by modulator 6 so that it is turned on and off to produce a pulsed reference beam which is passed through a light scattering medium 14, having object 9 therein, via mirror 5, beam splitter 10 and mirror 12. The resulting pulsed object signal beam 2 is directed at photorefractive crystal 18 via beam splitter 24, and an imaging lens 22 which images the object 9 inside light scattering medium 14 within crystal 18. Medium 14 could be a tissue section containing a potential malignancy constituting object 9, or a light scattering pathway within an optical system through which an image is being conveyed. Photorefractive crystal 18 is one type of real-time holographic storage medium which can be used in carrying out the present invention.

Pulsed reference beam 1, emerging from beam splitter 10, is also directed at the photorefractive crystal 18, after passing through mirror 16 and path length adjusting prism 20. Reference beam 1 interferes with the object signal beam 2 carrying the image of the object 9, focussed within the crystal 18 by lens 22. The lateral position of prism 20 is adjustable in the direction of arrow 19 to control the path length of the reference beam relative to the path length of the object signal beam, and when properly adjusted, a hologram of object 9, produced within crystal 18, is read out of the crystal by read-out beam 3, coherent with beams 1 and 2, and a clear image of the object is projected at camera 26, which records the clear image of the object 9, embedded within the light scattering medium 14.

In the absence of scatter, two pulse trains in phase with one another, are directed at the photorefractive crystal 18 by beams 1 and 2, and the resulting hologram within the crystal is read out by read-out beam 3, and a reconstruction of the object embedded within the light scattering medium 14 is recorded by camera 26, optically coupled to the crystal via beam splitter 24 and focusing lens 22. The photorefractive crystal 18 and the beams passed therethrough, constitute an all optical, two dimensional phase sensitive detector 21, fully described in U.S. Pat. No. 5,303,031 to Khoury et al., and incorporated by reference herein. In accordance with the phase sensitive detector of the patent, if the reference beam, directed at a photorefractive crystal, is modulated by a modulation frequency substantially equal to the modulation frequency of the signal beam carrying the object image, and these beams remain in phase with one another, a stationary real time hologram will be produced in the photorefractive crystal and can be read-out and captured by a camera. However, if this in phase wavefront phase relationship is not maintained, some degree of destructive interference will occur, and the read-out of a clear image from the crystal would no longer occur. Such destructive interference of the undesired noisy scattered light is used advantageously in the present invention to reduce the scatter distortion (noise) of the object beam, emerging from the light scattering medium 14. Destructive interference of the undesired scattered light is advantageously produced because wavefronts of scattered light arrive late at the phase detector crystal 18, relative to wavefronts of the desired "first light" discussed above.

Regarding the modulation parameters of the laser beam, the skilled worker in the art will recognize that either amplitude or frequency modulation of the laser light in the region of several Ghz will be appropriate since sidebands will be produced in either case. The result is that two superimposed holograms form within the holographic medium, and the difference between these two holograms contains information about the image embedded within the scattering medium which is used to readout a clear image to be photographed by camera 26.

Regarding real-time holographic storage medium 18, our preference is to employ high gain, low noise nonlinear materials such as ferroelectric photorefractive materials, eg. barium titanate with Rh doping in a self-bending geometry. This material has the largest coupling coefficient observed by us so far, and works in the wavelength range of primary interest for examining biological tissues. Other materials such as thin film polymers can be used with multi-stage amplification, because one thin film is not enough. Resonant systems such as atomic vapors, can also be used where high speed response at low light levels are required. In all of these geometries, we can use a diverging pump beam to ensure high resolution gain.

Figure 2:
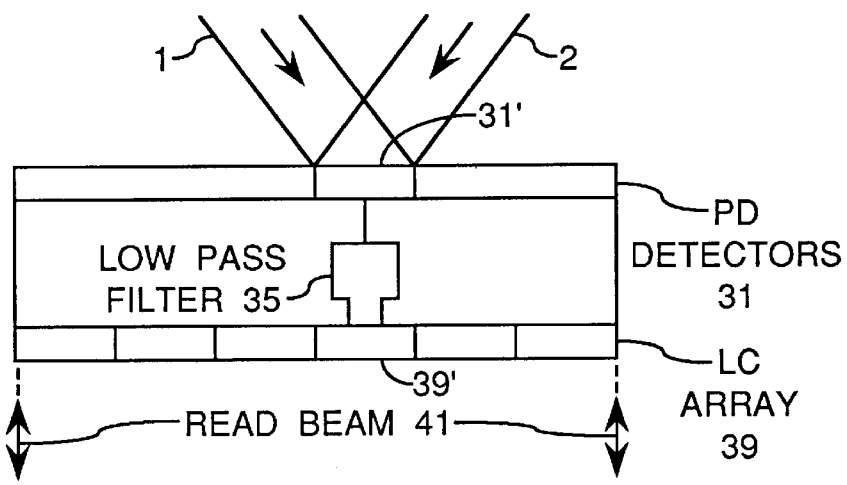
FIG. 2, illustrating a first liquid crystal light valve embodiment of the invention.

The real-time holographic storage medium can be replaced with an electro-optic device such as a smart pixel spatial light modulator. Such a device is described in a copending patent application of Jonathan Kane, Ser. No. 08/594,358 filed Oct. 27, 1995, now Pat. No. 5,654,538 assigned to the Secretary of the Air Force. A modified form of this device is illustrated in FIG. 2, and includes a pixel photodetector array 31, each detector thereof receiving a portion of the aforesaid reference beam 1 and a portion of distorted object beam 2 within the field. Each detector 31' is coupled to an associated liquid crystal pixel light modulator element 39' via a low pass filter element 35 of an array of such elements of the smart pixel device. The two incoming optical beams 1 and 2 are made to be coincident on the same detectors, each of which produces a current proportional to the interference or beat signal between the two incoming light waves. These two signals are brought into electronic low pass filter 35 and the resulting output voltage is then used to drive an associated liquid crystal (LC) light modulation element 39' of LC element array 39. Thus, this output voltage is used to drive the LC modulator pad elements which affect the state of polarization of the readout beam 41 passed through the LC crystal output array to display the output, as is conventional for image convertor light valves. The output can be read off of either the front or back side of the spatial light modulator via an external read beam 41. This apparatus may also be described as a light valve image convertor, well known in this art, and modified by filter elements as described. See for example, "Liquid Crystal Light Valve", Jan Grinberg et al., Optical Engineering, Vol. 14, No. 3 (1975). Hence, the aforesaid low pass filter function is performed electrically in this embodiment of the invention.

Figure 3:
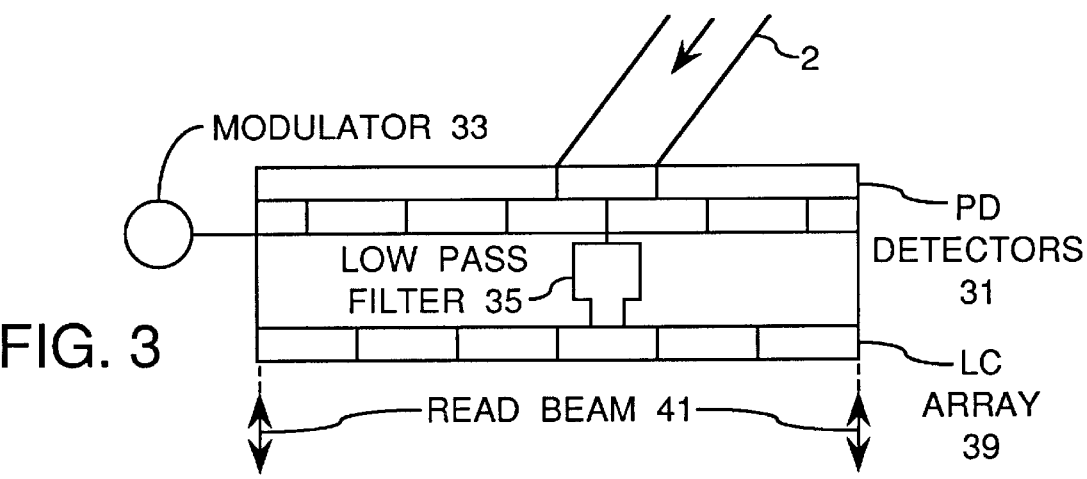
FIG. 3 illustrating a second liquid crystal light valve embodiment of the invention.

In accordance with the embodiment of FIG. 3, the reference wave 1 is eliminated and modulator 33 provides the reference modulation signal electronically so that each detector signal of detector array 31' would be modulated at the same phase and amplitude as the reference laser beam 1. Each resultant beat signal is passed through low pass filter element 35 to an associated LC display element of modulator array 39, which is read out by beam 41 as described above.

Since variations in the foregoing will readily occur to skilled workers in the art, the scope of the invention is to be limited solely by the terms of the following claims and art recognized equivalents thereto.

What is claimed is:

1. Method of retrieving a clear image of an object having its image passed through a three-dimensional light scattering medium which produces an unclear image comprising the steps of:

(a) providing a real-time holographic storage member;

(b) passing a modulated coherent signal light beam bearing said image and modulated by a particular modulation signal, through said three-dimensional light scattering medium for producing a noisy signal beam carrying said unclear image due to scattering of the light by said three-dimensional light scattering medium;

(c) directing said noisy signal beam at said real time holographic storage member;

(d) forming a hologram in said real-time holographic storage member by directing a modulated reference light beam, modulated by said particular modulation signal, coherent with respect to said modulated signal beam and unaffected by said light scattering medium at said real-time holographic storage member during the performance of step (c);

(e) reading out said hologram from said real-time holographic storage member to retrieve said clear image of said object substantially free of optical noise due to scatter within said scattering medium; and (f) wherein said modulated signal light beam is passed through an object and thereafter through said three-dimensional light scattering medium.

2. Method of claim 1 wherein said holographic storage member comprises a photorefractive crystal and step (e) is performed by directing a read-out light beam at said photorefractive crystal coherent with said reference light beam.

3. The method of claim 1 wherein step (c) includes focusing an image within said noisy signal beam upon said holographic storage medium.

4. Method of retrieving a clear image of an object having its image passed through a three-dimensional light scattering medium which produces an unclear image comprising the steps of:

(a) providing a real-time holographic storage member;

(b) passing a modulated coherent signal light beam bearing said image and modulated by a particular modulation signal, through said three-dimensional light scattering medium for producing a noisy signal beam carrying said unclear image due to scattering of the light by said three-dimensional light scattering medium;

(c) directing said noisy signal beam at said real time holographic storage member;

(d) forming a hologram in said real-time holographic storage member by directing a modulated reference light beam, modulated by said particular modulation signal, coherent with respect to said modulated signal beam and unaffected by said light scattering medium at said real-time holographic storage medium during the performance of step (c);

(e) reading out said hologram from said real-time holographic storage member to retrieve said clear image of said object substantially free of optical noise due to scatter within said scattering medium; and wherein said modulated signal light beam is passed through biologic tissue having said object embedded therein.

5. Method of claim 4 wherein said holographic storage member comprises a photorefractive crystal and step (e) is performed by directing a read-out light beam at said photorefractive crystal coherent with said reference light beam.

6. Method of retrieving a clear image of an object having its image passed through a three-dimensional light scattering medium which produces an unclear image comprising the steps of:

(a) illuminating a photorefractive member with a coherent modulated reference beam, modulated by a particular modulation signal;

(b) passing an image bearing signal beam modulated by said particular modulation signal, and coherent with respect to said modulated reference beam, through said three-dimensional light scattering medium to produce a noisy signal beam having said unclear image therein;

(c) interfering said noisy signal beam with said coherent modulated reference beam within said photorefractive member to produce a hologram therein;

(d) reading out said hologram from said photorefractive member by illuminating said photorefractive member with an unmodulated readout beam coherent with said reference beam and said signal beam to retrieve said clear image; and wherein said modulated signal beam is passed through said object and thereafter through said three-dimensional light scattering medium.

7. The method of claim 5 wherein said photorefractive member comprises a low pass light valve image converter.

8. Method of retrieving a clear image of an object having its image passed through a three-dimensional light scattering medium which produces an unclear image comprising the steps of:

(a) illuminating a photorefractive member with a coherent modulated reference beam, modulated by a particular modulation signal;

(b) passing an image bearing signal beam modulated by said particular modulation signal, and coherent with respect to said modulated reference beam, through said three-dimensional light scattering medium to produce a noisy signal beam having said unclear image therein;

(c) interfering said noisy signal beam with said coherent modulated reference beam within said photorefractive member to produce a hologram therein; and (d) reading out said hologram from said photorefractive member by illuminating said photorefractive member with an unmodulated readout beam coherent with said reference beam and said signal beam to retrieve said clear image; and wherein said modulated signal beam is passed through biologic tissue having said object embedded therein.

9. The method of claim 8 wherein said photorefractive member comprises a low pass light valve image converter.

* * * * *